United States Patent
Lin

(10) Patent No.: US 10,503,489 B1
(45) Date of Patent: Dec. 10, 2019

(54) UPDATING FIRMWARE VIA A REMOTE UTILITY

(71) Applicant: QUANTA COMPUTER INC., Taoyuan (TW)

(72) Inventor: Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/986,234

(22) Filed: May 22, 2018

(51) Int. Cl.
  *G06F 8/65* (2018.01)
  *G06F 9/4401* (2018.01)

(52) U.S. Cl.
  CPC .............. *G06F 8/65* (2013.01); *G06F 9/442* (2013.01)

(58) Field of Classification Search
  CPC ........................................................ G06F 8/65
  USPC ........................................................ 717/168
  See application file for complete search history.

(56) References Cited

U.S. PATENT DOCUMENTS

| | | | | |
|---|---|---|---|---|
| 7,661,102 | B2* | 2/2010 | Ogle | G06F 8/658 |
| | | | | 717/168 |
| 8,904,374 | B2* | 12/2014 | Nakamura | G06F 8/66 |
| | | | | 717/168 |
| 2006/0004756 | A1* | 1/2006 | Peleg | G06F 8/62 |
| 2007/0043833 | A1 | 2/2007 | Lu et al. | |
| 2007/0192532 | A1 | 8/2007 | Ogle | |
| 2010/0228960 | A1 | 9/2010 | Huang et al. | |
| 2011/0113414 | A1* | 5/2011 | Ewington | G06F 8/63 |
| | | | | 717/168 |
| 2011/0173604 | A1* | 7/2011 | Nakamura | G06F 8/63 |
| | | | | 717/173 |
| 2011/0231834 | A1* | 9/2011 | Kim | G06F 1/3212 |
| | | | | 717/173 |
| 2012/0144380 | A1* | 6/2012 | Rabeler | G06F 8/658 |
| | | | | 717/170 |

(Continued)

FOREIGN PATENT DOCUMENTS

| | | |
|---|---|---|
| EP | 2330508 A1 | 6/2011 |
| TW | 201535261 A | 9/2015 |
| TW | 201702929 A | 1/2017 |

OTHER PUBLICATIONS

"Updating Your Firmware When the System is Powered Down"; IBM.com knowledge center website [full URL in ref.]; Oct. 24, 2014 (Year: 2014).*

(Continued)

*Primary Examiner* — Qing Chen
*Assistant Examiner* — Clint Thatcher
(74) *Attorney, Agent, or Firm* — Nixon Peabody LLP; Zhou Lu

(57) ABSTRACT

Systems and methods are provided for updating firmware on a firmware storage device in a computing device without losing existing data on the firmware storage device. An exemplary method comprises a local utility retrieving an existing image of the firmware from a management device in the computing device. The firmware can be located on a firmware storage device in the computing device. The method can then retrieve a new image of updated firmware. The method can analyze the existing image and the new image. Based on analysis of the existing image and the new image, the method can create a processed image from the existing image and the new image. The method can then provide for writing the processed image to the firmware storage device of the computing device.

20 Claims, 5 Drawing Sheets

(56) References Cited

U.S. PATENT DOCUMENTS

| | | |
|---|---|---|
| 2014/0317611 A1 | 10/2014 | Wojcik et al. |
| 2016/0179500 A1 | 6/2016 | Hsieh et al. |
| 2018/0349129 A1* | 12/2018 | Ju .......................... G06F 8/654 |
| 2019/0012164 A1* | 1/2019 | Geng ....................... G06F 8/65 |

OTHER PUBLICATIONS

Extended European Search Report for EP Application No. 18202987.6, dated Jun. 18, 2019.
TW Office Action for Application No. 107133549, dated Oct. 31, 2019, w/ First Office Action Summary.
TW Search Report for Application No. 107133549, dated Oct. 31, 2019, w/ First Office Action.

* cited by examiner

UPDATING FIRMWARE VIA A REMOTE UTILITY

FIELD

The present invention relates to updating firmware of a computing device, and more specifically, to systems and methods for updating firmware by use of a remote utility.

BACKGROUND

Firmware is a piece of software that provides low-level control for a computing device's hardware. Firmware can be permanently installed in the computing device in a firmware storage device, e.g., in non-volatile memory components of the computing device. Firmware can be run through a computing device's central processing unit when the computing device is booted up. The computing device can have an operating system stored in its memory, and the operating system can access the firmware.

Occasionally, there may be a need for updating the firmware on the computing device. However, updating firmware can be a challenging process because of the need to retain operation functionality of the computing device both during and after the firmware is updated. Consequently, firmware vendors often try to avoid firmware updates because of the difficulty of maintaining a computing device's operation during and after updates. Nonetheless, the need for a firmware update for a computing device may be unavoidable in certain circumstances. For example, firmware updates may be needed to fix functionality issues detected after the computing device has shipped. Firmware updates may be needed to enable features already programmed into the computing device but not yet accessible by other software running on the computing device. Firmware updates may also be needed to upgrade the type of file formats that can be accessed by the computing device, or to update battery management features for the computing device.

One current method for updating firmware relies on booting into the operating environment already on the computing device. Through that operating environment, a process can be performed to implement the firmware updates into the firmware storage device. However, this process cannot recover computing devices with a failed operating environment. For example, this process cannot update firmware where the firmware has crashed, or where the operating environment on the computing device is inoperable.

Another current method for updating firmware relies on the use of an external management device that connects to the firmware storage device. This external management device can allow a firmware storage device to power on—even when the operating environment on the computing device is inoperable. However, such external management devices typically cannot perform more complex functions like selectively reading, editing, and writing data onto the firmware storage device. As a result, using an external management device typically results in having to rewrite or reimage the entire firmware. Consequently, when the firmware is rewritten, any previously existing data on the firmware storage device may be lost. The loss of such data may be unacceptable to the owner or operator of the computing device.

Therefore, what is needed is a system and method for updating firmware that does not require reimaging the entire firmware stored on the firmware storage device. Such a system and method should be able to provide updates even while the operating environment on the computing device is inaccessible. Such a system or method should provide an ability to do complex computational functions, and carry out customized update procedures on the firmware storage device. Finally, such a system and method should be able to host updates for a variety of firmware storage devices in a variety of computing devices for ease of operability.

SUMMARY

The various examples of the present disclosure are directed towards a computer-implemented method for updating firmware on a computing device. An exemplary method, according to an embodiment of the present disclosure, first retrieves an existing image of the firmware. The firmware can be located on a firmware storage device in the computing device. The method can then retrieve a new image of updated firmware. The method can analyze the existing image and the new image. Based on analysis of the existing image and the new image, the method can create a processed image from the existing image and the new image. The method can then provide for writing the processed image to the firmware storage device of the computing device.

In some examples, the method provides for performing all steps where the computing device is powered off.

In some examples, analyzing the existing image can further comprise comparing a plurality of updates in the new image with existing data from the existing image. This comparison can identify the existing data that does not conflict with the new image.

In other examples, creating the processed image can further comprise combining the new image with non-conflicting existing data to form the processed image.

In other examples, the method can further comprise rebooting the firmware storage device and running the processed image on the firmware storage device.

Another exemplary embodiment of the present disclosure provides for a computer system which is configured to update an existing image on a computing device. The computer system can comprise a memory and a processing unit. The processing unit can be in communication with the memory. The processing unit can store instructions which, when executed, cause the computer system to perform a series of operations. First, the computer system can retrieve an existing image of the firmware. The firmware can be located on a firmware storage device in the computing device. The instructions can then provide for analyzing the existing image and the new image. Based on the analysis of the existing image and the new image, the instructions can create a processed image from the existing image and the new image. The instructions can complete by writing the processed image to the firmware storage device of the computing device.

In some examples, the computing device can be powered off.

In other examples, analyzing the existing image can further comprise comparing a plurality of updates in the update procedures with existing data from the existing image. This allows for identification of the existing data which does not conflict with the new image.

In other examples, creating the processed image can further comprise combining the new image with non-conflicting existing data to form the processed image.

In other examples, the instructions can further comprise rebooting the firmware storage device and running the processed image on the firmware storage device.

In a third embodiment, the present disclosure provides for a non-transitory computer-readable medium which stores instructions. The instructions, when executed by a computer system, cause the computer system to perform a series of operations. The series of operations begins with retrieving an existing image of the firmware. The firmware can be located on a firmware storage device in the computing device. The instructions can then provide for analyzing the existing image and the new image. Based on the analysis of the existing image and the new image, the instructions can then provide for creating a processed image from the existing image and the new image. Lastly, the instructions can provide for writing the processed image to the firmware storage device of the computing device.

In some examples, the computing device can be powered off.

In other examples, analyzing the existing image can further comprise comparing a plurality of updates in the update procedures with existing data from the existing image. This allows identification of the existing data which does not conflict with the new image.

In other examples, creating the processed image can further comprise combining the new image with non-conflicting existing data to form the processed image.

In other examples, the instructions can further comprise rebooting the firmware storage device and running the processed image on the firmware storage device.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1A:
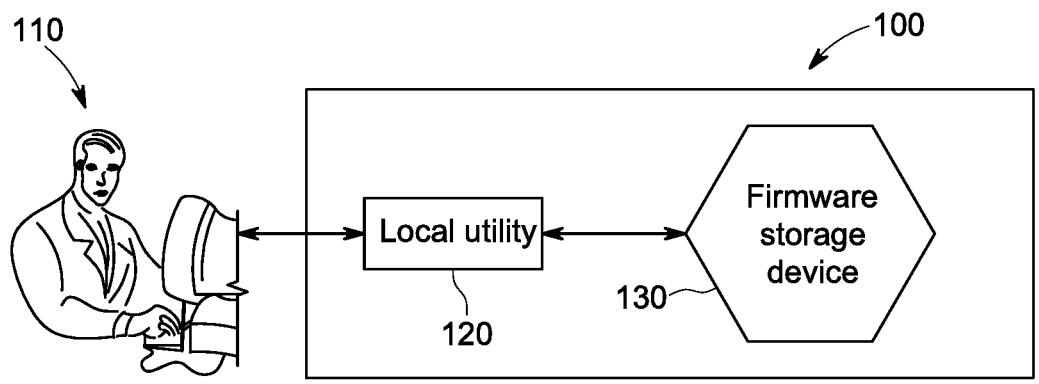
FIG. 1A shows a schematic diagram of a user updating a firmware storage device according to a conventional method that relies on the operating environment of the firmware storage device.

With regards to the present disclosure, the term "computing device" can refer to any electronically-powered or battery-powered equipment that has hardware and software components, where the software components can be configured for operating features on the device.

With regards to the present disclosure, the term "operating environment" can refer to any operating system or environment that functions to allow software to run on the computing device.

DETAILED DESCRIPTION

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of limitations of existing systems, the present disclosure is directed towards a methodology that updates firmware on a computing device without removing all existing data from a firmware storage device holding the firmware. An exemplary method can comprise first powering off the computing device, and then initiating an update procedure for updating the firmware from a remote utility. The remote utility can retrieve an existing image of the firmware. The remote utility can also retrieve a new image of an updated firmware. The remote utility can analyze the existing image and the new image. Based on the analysis of the existing image and the new image, the remote utility can create a processed image from the existing image and the new image. The remote utility can then provide for writing the processed image to the firmware storage device of the computing device.

Therefore, an exemplary method, according to an embodiment of the present disclosure, can provide updates to a firmware storage device through the use of a remote utility. An exemplary method, according to an embodiment of the present disclosure, does not require the operating environment of the computing device to be operational, or for the firmware to be accessible by the operating environment. For example, the method can perform all steps while the computing device is powered off.

Unlike conventional systems, the present procedure additionally uses a remote utility to update the firmware. The remote utility provides advantages because it can conduct complex operating procedures. For example, a remote utility can analyze an image from the firmware storage device to determine what data can be retained with the new image, and what data needs to be replaced. The remote utility can copy old firmware data that should be saved; merge it with new firmware data associated with the firmware update; and create a processed image containing both. The remote utility can then direct the management device to write the processed image to the firmware storage device. Therefore, the updated firmware storage device can retain data from the device before the update procedure.

FIG. 1A shows a system 100 that can update a firmware storage device relying on the operating system running on the computing device, according to a conventional method. The system 100 is a computing device accessible by a user 110. The system 100 includes a local utility 120 and a firmware storage device 130. The firmware storage device 130 is the portion of the system 100 that requires a firmware update. The user 110 is an individual who can initiate the update procedure for the firmware storage device 130. The local utility 120 can be an operating environment running on the system 100. The local utility 120 can perform complex tasks on the firmware storage device 130. However, the system 100 must be turned on and booted into the local utility 120 for the user 110 to access both the local utility 120 and the firmware storage device 130. Additionally, if the local utility 120 cannot access the firmware storage device 130 for any reason, then the user 110 cannot update the firmware storage device 130 in the system 100.

Figure 1B:
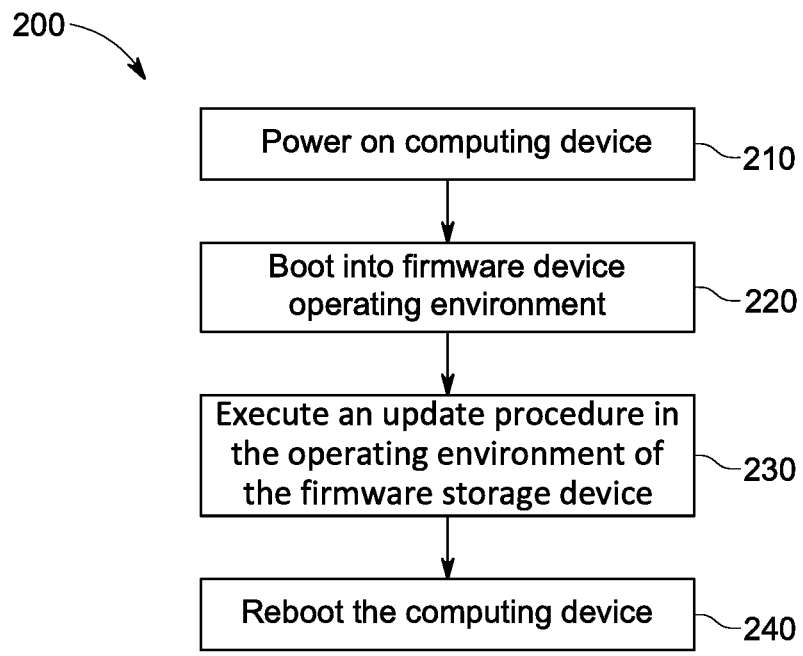
FIG. 1B is a flowchart of the methodology for updating firmware that relies on the operating environment of the firmware storage device.

FIG. 1B shows a flowchart of an existing method 200 to update a firmware storage device that relies on the operating system of the firmware storage device and operating within the system 100 of FIG. 1A. Referring now to FIG. 1B, the method 200 begins by powering on the system 100 and the firmware storage device 130. Notably, this method 200 requires both the firmware storage device 130 and the system 100 to power on, in order for the method 200 to proceed with updating the firmware storage device 130.

In step 220, the method 200 boots the system 100 into the operating environment for updating the firmware on the firmware storage device 130. The operating environment can be the local utility 120 discussed with respect to FIG. 1A. Notably, this method 200 cannot proceed to update the firmware storage device 130 if the method 200 cannot successfully boot the system 100 into an operating environment. There are many situations where a computing device, such as the system 100, cannot boot into an operating environment. For example, the firmware storage device 130 can have corrupted software which prevents the local utility 120 from being loaded by the system 100, or from properly operating.

In step 230, the method 200 can execute an update procedure with the operating environment of the system 100 to update the firmware on the firmware storage device 130. If the method 200 has successfully powered on the system 100 and successfully booted into the operating environment for updating the firmware on the firmware storage device 130, this step 230 provides the method 200 with the ability to retain existing data on the firmware storage device 130 while the method 200 completes the update procedure.

In step 240, the method 200 has completed the update procedure and now reboots the system 100. Rebooting the system 100 allows the new updates provided by the method 200 and stored in the firmware storage device 130 to be used to start up the system.

However, as previously noted, the method 200 has severe limitations which affect the flexibility of an update procedure according to the method 200. Most importantly, the method 200 cannot proceed if the user 110 cannot both: (1) turn on the system 100; and (2) boot into the local utility 120. These requirements are captured in steps 210 and 220 of method 200, respectively.

Figure 2A:
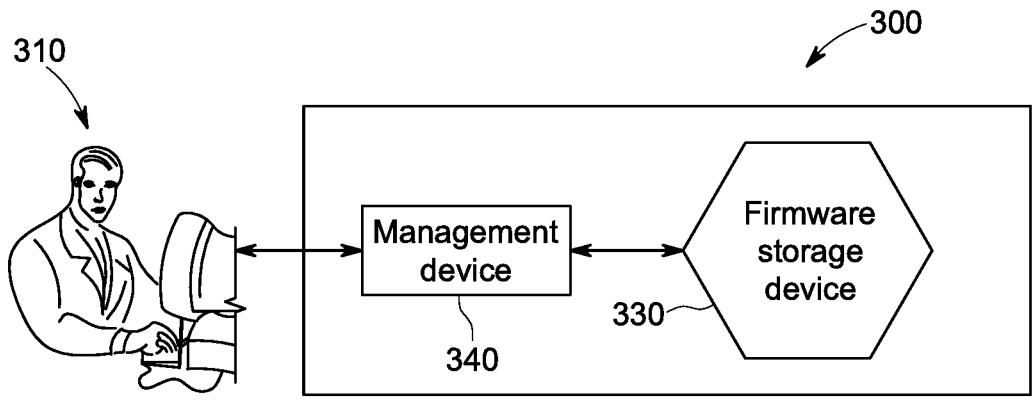
FIG. 2A shows a schematic diagram of a user updating a firmware storage device according to a conventional method that relies on an external management device.

FIG. 2A shows a system 300 which can update a firmware relying on the use of a management device. The system 300 is accessible by a user 310 and includes a management device 340 and a firmware storage device 330. The management device 340 can be designed on the motherboard of the system 300 and be internal to the system 300. The management device 340 can work even when the system is powered off because the management device 340 can be equipped with its own microprocessor operating on standby power. The firmware storage device 330 is the device requiring an update procedure. The user 310 is an individual who can initiate the update procedure for the firmware storage device 330. The management device 340 can be external to the firmware storage device 330. The management device 340 can complete basic tasks according to instructions from the user 310. For example, the management device 340 can read all data from the firmware storage device 330; delete all data from the firmware storage device 330; and/or write data to the firmware storage device 330. Writing data to the firmware storage device 330 renders existing data on the firmware storage device 330 inaccessible because the computing device will only read the newly written data. The management devices 340 can be used to complete update procedures for the firmware storage device 330 when the system 300 cannot power on. The management device 340 can therefore supply the operating environment for updating the firmware storage device 330.

Figure 2B:
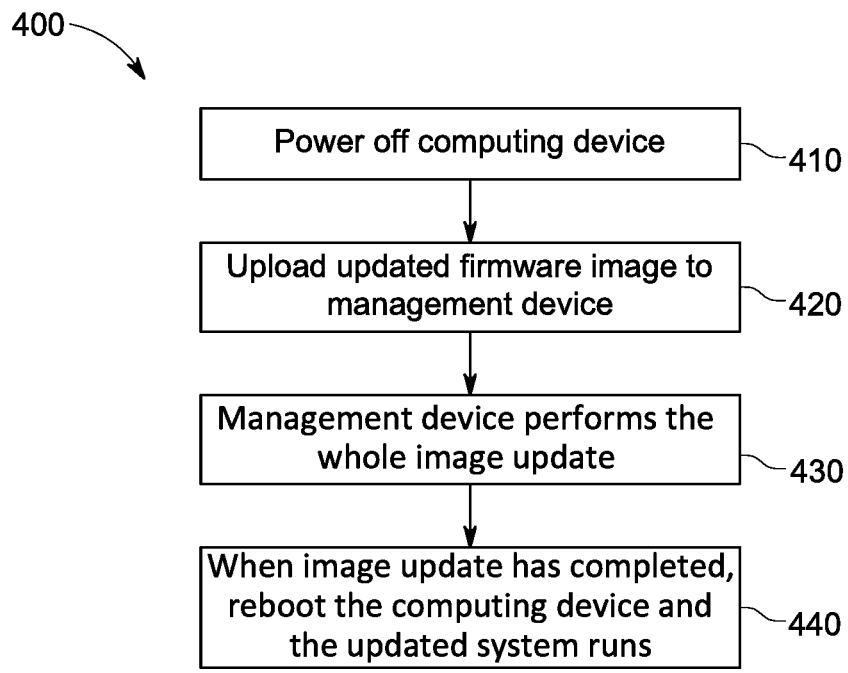
FIG. 2B is a flowchart of the methodology for updating firmware that relies on an external management device.

FIG. 2B shows a flowchart of an existing methodology to update firmware that relies on the use of a management device and operating within the system 300 of FIG. 2A. Referring now to FIG. 2B, the method 400 begins by powering off the computing device in step 410. Powering off the computing device prevents the computing device from accessing the firmware storage device at the same time as the management device accesses the firmware storage device. If both the computing device and the management device accessed the firmware storage device at the same time, the commands could conflict and prevent the update process from completing.

In step 420, the user 310 can begin an update procedure via the management device 340. The user 310 can upload an updated firmware image to the management device 340. The updated firmware image provides an updated version of the firmware for the firmware storage device 330.

In step 430, the management device 340 reimages the firmware stored in firmware storage device 330. That is, the management device 340 first deletes the existing image on the firmware storage device 330, and then writes the updated firmware image to the firmware storage device 330. Alternatively, the management device 340 can simply overwrite the updated firmware image onto the firmware storage device 330. At this stage, access to any existing data on the firmware storage device 330 is lost because the computing device will only read the newly written data.

In step 440, the image update for the firmware storage device 330 has completed. Therefore, step 440 provides for a reboot of the system 300. Rebooting the system 300 allows the system 300 to start up using the newly updated firmware provided by the method 400.

Method 400 has severe limitations in that the update procedure completely reimages the firmware in the firmware storage device 330. Therefore, method 400 does not allow for any selective editing of the firmware. Method 400 does not allow for retention of modifications or settings previously applied to the firmware in the firmware storage device 330. With an update procedure according to method 400, the user 310 would have to perform the redundant task of setting up anew the firmware stored in the firmware storage device 330 according to preferences for the system 300.

In view of the limitations of the methods 200 and 400, the present disclosure provides a new method which does not require the deletion of existing data in a firmware storage device of a computing device or system. Additionally, the method can be used when the computing device or system is powered off. Therefore, the present disclosure provides a flexible update method that provides an improvement over existing techniques.

Figure 3A:
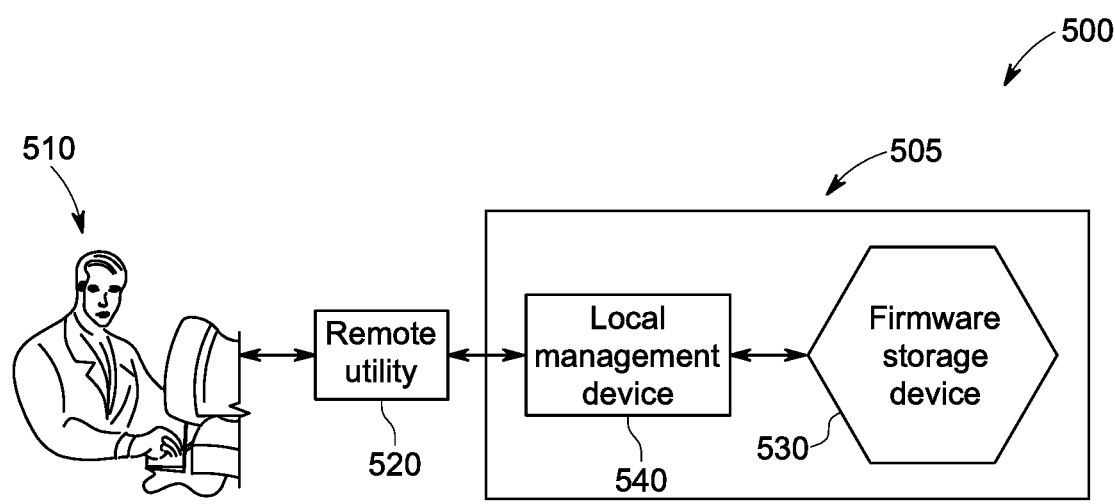
FIG. 3A shows a schematic diagram of a user updating a firmware storage device according to an exemplary embodiment of the present disclosure.

FIG. 3A shows a system 500 which can update a firmware storage device 530 using a remote utility 520 and a management device 540. The system 500 is accessible by a user 510 and includes a computing device 505 and a remote utility 520. The computing device 505 includes a management device 540 and the firmware storage device 530. The firmware storage device 530 is the device requiring an update. The user 510 is an individual who can initiate the update procedure for the firmware storage device 530.

As provided by the present disclosure, the management device 540 can be internal to the computing device 505. The management device 540 can complete basic tasks according to instructions from the user 510. For example, the management device 540 can read all data from the firmware storage device 530; delete all data from the firmware storage device 530; or write data to the firmware storage device 530. Writing data to the firmware storage device 530 can render existing data on the firmware storage device 530 inaccessible because the computing device will only read the newly written data. The management devices 540 can be used to complete update procedures for the firmware storage device 530 when the computing device 505 cannot power on. The management device 540 can act as an operating environment for updating the firmware on the firmware storage device 530. The management device can be configured with its own microprocessor and memory to run separately from the main operating system run by the computing device. The management device can operate through standby power to read and/or write to the firmware storage device even when the computing device is powered off or not bootable.

The remote utility 520 is a computer system that is independent to the computing device 505. The remote utility 520 can be communicatively coupled with the computing device 505. Further, the remote utility can be configured to complete complex tasks with firmware and the computing device 505, such as verification of a firmware image, retrieving and preserving settings of the firmware stored in the firmware storage device 530, and/or analyzing an old images read from the firmware storage device 530. For example, the remote utility 520 can be a smart phone, a desktop computer, a laptop computer, a tablet, or any other computer system which the user 510 can interact with to carry out software edit and analysis functions.

Figure 3B:
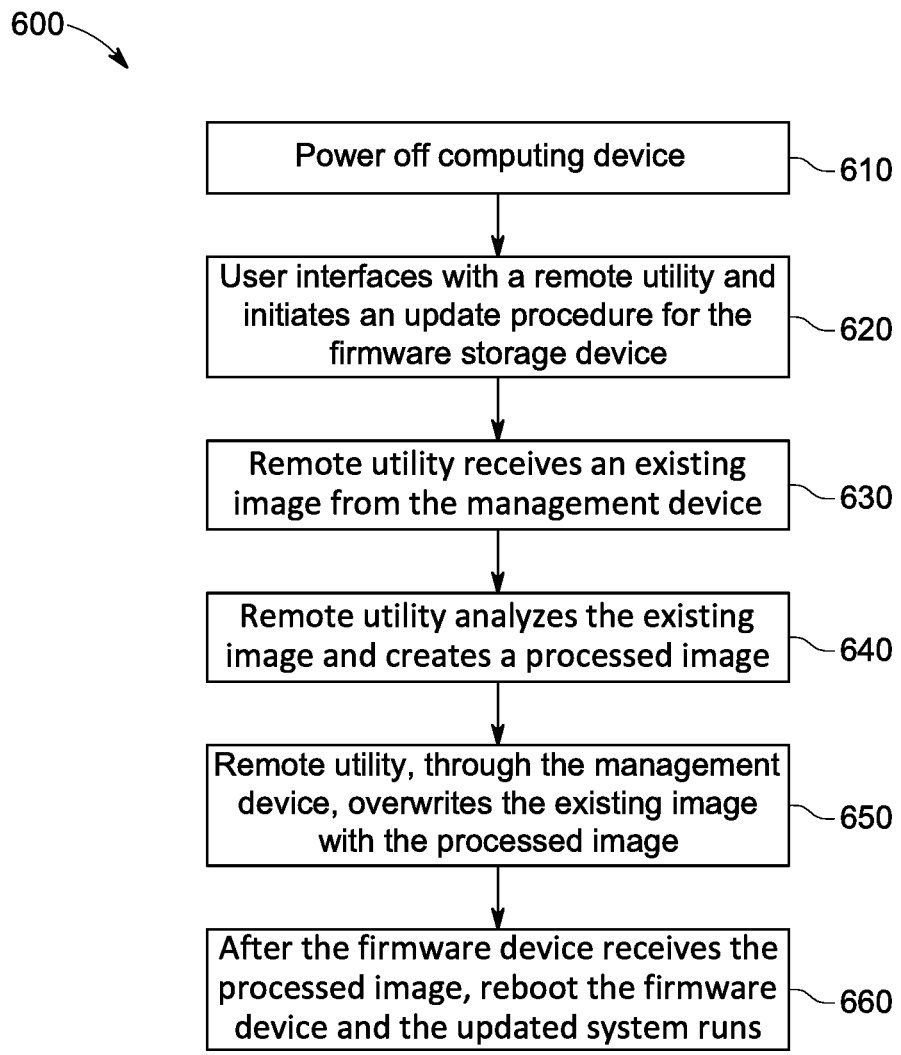
FIG. 3B is a flowchart of the methodology for updating firmware according to an embodiment of the present disclosure.

FIG. 3B shows a flowchart of an exemplary methodology to update a firmware storage device, according to an embodiment of the present disclosure. This methodology can operate on the system 500 of FIG. 3A. Referring back to FIG. 3B, the method can begin by powering off the computing device 505 in step 610. Powering off the computing device 505 prevents the computing device 505 from accessing the firmware storage device 530 at the same time as the management device 540 accesses the firmware storage device 530. If both the computing device 505 and the management device 540 accessed the firmware storage device 530 at the same time, the commands could conflict and prevent the update process from completing.

In step 620, the user 510 can begin an update procedure for updating the firmware stored on the firmware storage device 530 via the remote utility 520. In particular, the user 510 can first upload an updated firmware image to the remote utility 520. Using the remote utility 520 instead of just the management device 540 allows further customization of the update process than if the method just used the management device 540. The management device's 540 functionality is determined by the management device's designer, who has little to no knowledge about what types of firmware the management device 540 will need to update. By contrast, a remote utility 520 can be designed by the designer of the firmware storage device 530, who is familiar with what firmware will need updating. Therefore, use of the remote utility 520 allows easier implementation and maintenance of an update process.

In step 630, the remote utility 520 receives an existing image of the firmware in the firmware storage device 530 from the management device 540. This step involves the management device 540 reading all data currently existing on the firmware storage device 530. The management device 540 can provide this data as the existing image to the remote utility 520.

In step 640, the remote utility 520 can analyze the existing image. This analysis involves the remote utility 520 comparing the new firmware with the existing image. The remote utility 520 can identify which portions of the data in the existing data do not conflict with the updates in the new firmware. The remote utility 520 can create a processed image that retains all updates provided by the update procedure and retains all non-conflicting existing data from the firmware storage device 530.

For example, the remote utility 520 can analyze the existing image by performing a firmware image security check and keeping the original firmware settings stored in the existing image. The remote utility 520 can first retrieve a public key from the existing image. The remote utility 520 can then use a public key to confirm that the new firmware image uploaded by the user is properly signed by the correct private key. If the remote utility 520 is unable to verify the proper signature, then the remote utility 520 can deny the update request. If the remote utility 520 can verify the proper signature, then the remote utility 520 can retrieve the original firmware settings stored in the existing image. The remote utility 520 can then combine the settings with the new firmware image to create the processed image.

In other examples, the remote utility 520 designer can add other complex analysis which can be difficult for the management device 540 but easy for the remote utility 520.

In step 650, the remote utility 520 can command the management device 540 to overwrite the existing image with the processed image in the firmware storage device 530. For example, the management device 540 can erase the existing image from the firmware storage device 530. Erasure of the existing image can be needed because some firmware storage devices use SPI flash. When writing to SPI flash, an erasure command can ensure all bits are properly reverted before new data is written to the firmware storage device.

In step 660, the firmware updating process for the firmware storage device 530 has completed. Therefore, step 660 provides for a reboot of the system 500. Rebooting the system 500 allows the firmware storage device 530 to start up using the new updates provided by the method 600.

Therefore, method 600 provides a technique to update a firmware storage device without losing all existing data on the firmware storage device 530. By the method 600, any non-conflicting existing data on the firmware storage device 530 can be preserved in the update procedures. The updates can be completed regardless of whether the firmware storage device 530 is powered on or off. Additionally, the updates can be completed regardless of whether an operating environment for updating the firmware storage device 530 is available.

Figure 4:
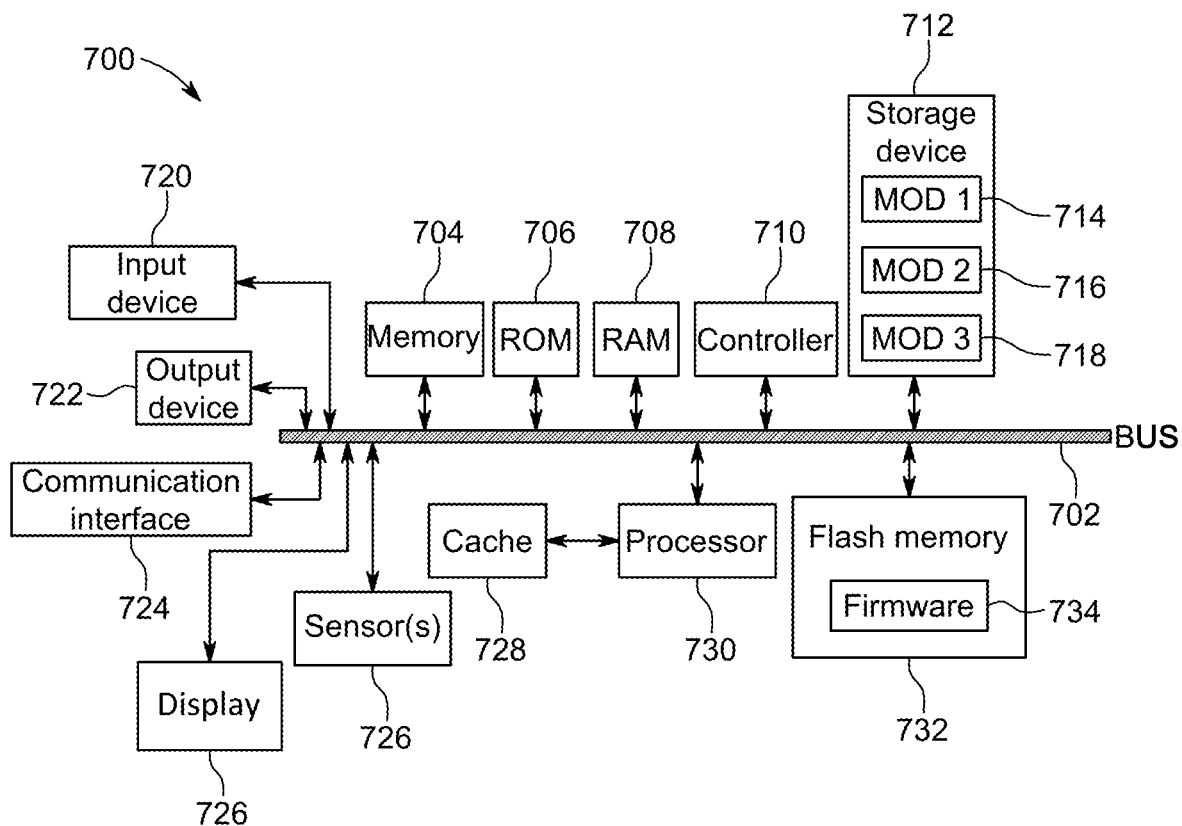
FIGS. 4 and 5 provide schematic diagrams of computer systems that can be used to perform various aspects of the present disclosure.

FIG. 4 illustrates an example computing system 700, in which components of the computing system are in electrical communication with each other using a bus 702. The system 700 includes a processing unit (CPU or processor) 730; and a system bus 702 that couples various system components, including the system memory 704 (e.g., read only memory [ROM] 706 and random access memory [RAM] 708), to the processor 730. The system 700 can include a cache of high-speed memory connected directly with, in close proximity to, or integrated as part of the processor 730. The system 700 can copy data from the memory 704 and/or the storage device 712 to the cache 728 for quick access by the processor 730. In this way, the cache can provide a performance boost for processor 730 while waiting for data. These and other modules can control or be configured to control the processor 730 to perform various actions. Other system memory 704 may be available for use as well. The memory 704 can include multiple different types of memory with different performance characteristics. The processor 730 can include any general purpose processor and a hardware module or software module, such as module 1 714, module 2 716, and module 3 718 embedded in storage device 712. The hardware module or software module is configured to control the processor 730, as well as a special-purpose processor where software instructions are incorporated into the actual processor design. The processor 730 may be a completely self-contained computing system, and contain multiple cores or processors, a bus, memory controller, cache, etc. A multi-core processor may be symmetric or asymmetric.

To enable user interaction with the computing device 700, an input device 720 is provided as an input mechanism. The input device 720 can comprise a microphone for speech, a touch-sensitive screen for gesture or graphical input, keyboard, mouse, motion input, and so forth. In some instances, multimodal systems can enable a user to provide multiple types of input to communicate with the system 700. In this example, an output device 722 is also provided. The communications interface 724 can govern and manage the user input and system output.

Storage device 712 can be a non-volatile memory to store data that are accessible by a computer. The storage device 712 can be magnetic cassettes, flash memory cards, solid state memory devices, digital versatile disks, cartridges, random access memories (RAMs) 708, read only memory (ROM) 706, and hybrids thereof.

The controller 710 can be a specialized microcontroller or processor on the system 700, such as a BMC (baseboard management controller). In some cases, the controller 710 can be part of an Intelligent Platform Management Interface (IPMI). Moreover, in some cases, the controller 710 can be embedded on a motherboard or main circuit board of the system 700. The controller 710 can manage the interface between system management software and platform hardware. The controller 710 can also communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components, and maintain the alerts or notifications in a system event log storage component.

Flash memory 732 can be an electronic non-volatile computer storage medium or chip that can be used by the system 700 for storage and/or data transfer. The flash memory 732 can be electrically erased and/or reprogrammed. Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the system 700, when the system 700 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the system 700 is started. The firmware 734 can recognize, initialize, and test hardware present in the system 700 based on the set of configurations. The firmware 734 can perform a self-test, such as a POST (Power-on-Self-Test), on the system 700. This self-test can test functionality of various hardware components such as hard disk drives, optical reading devices, cooling devices, memory modules, expansion cards, and the like. The firmware 734 can address and allocate an area in the memory 704, ROM 706, RAM 708, and/or storage device 712, to store an operating system (OS). The firmware 734 can load a boot loader and/or OS, and give control of the system 700 to the OS.

The firmware 734 of the system 700 can include a firmware configuration that defines how the firmware 734 controls various hardware components in the system 700. The firmware configuration can determine the order in which the various hardware components in the system 700 are started. The firmware 734 can provide an interface, such as an UEFI, that allows a variety of different parameters to be set, which can be different from parameters in a firmware default configuration. For example, a user (e.g., an administrator) can use the firmware 734 to specify clock and bus speeds; define what peripherals are attached to the system 700; set monitoring of health (e.g., fan speeds and CPU temperature limits); and/or provide a variety of other parameters that affect overall performance and power usage of the system 700. While firmware 734 is illustrated as being stored in the flash memory 732, one of ordinary skill in the art will readily recognize that the firmware 734 can be stored in other memory components, such as memory 704 or ROM 706.

System 700 can include one or more sensors 726. The one or more sensors 726 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 726 can communicate with the processor, cache 728, flash memory 732, communications interface 724, memory 704, ROM 306, RAM 308, controller 710, and storage device 712, via the bus 702, for example. The one or more sensors 726 can also communicate with other components in the system via one or more different means, such as inter-integrated circuit (I2C), general purpose output (GPO), and the like. Different types of sensors (e.g., sensors 726) on the system 700 can also report to the controller 710 on parameters, such as cooling fan speeds, power status, operating system (OS) status, hardware status, and so forth.

Figure 5:
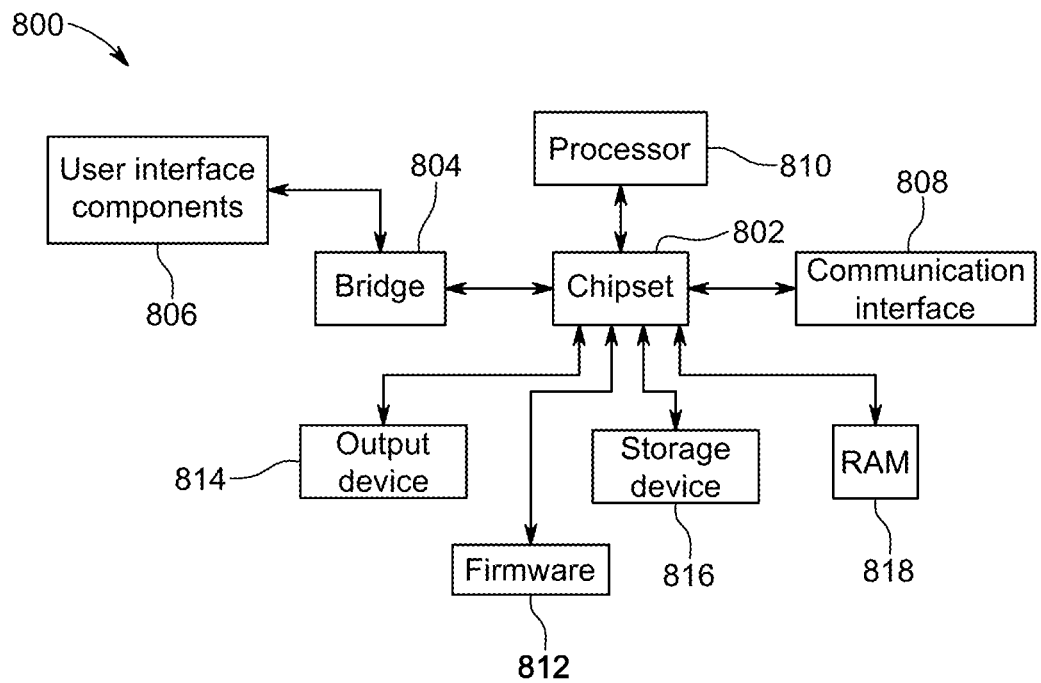

FIG. 5 illustrates an example computer system 800 having a chipset architecture that can be used in executing the described method(s) or operations, and in generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to, and output from, processor 810. In this example, chipset 802 outputs information to output device 814, such as a display, and can read and write information to storage device 816, which can include magnetic media, and solid state media, for example. Chipset 802 can also read data from, and write data to, RAM 818. A bridge 804 for interfacing with a variety of user interface components 806, can be provided for interfacing with chipset 802. Such user interface components 806 can include a keyboard, a microphone, touch detection and processing circuitry, a pointing device, such as a mouse, and so on. In general, inputs to system 800 can come from any of a variety of sources, machine generated and/or human generated.

Chipset 802 can also interface with one or more communication interfaces 808 that can have different physical interfaces. Such communication interfaces can include interfaces for wired and wireless local area networks, broadband wireless networks, and personal area networks. Further, the machine can receive inputs from a user via user interface components 806 and execute appropriate functions, such as browsing functions by interpreting these inputs using processor 810.

Moreover, chipset 802 can also communicate with firmware 812, which can be executed by the computer system 800 when powering on. The firmware 812 can recognize, initialize, and test hardware present in the computer system 800, based on a set of firmware configurations. The firmware 812 can perform a self-test, such as a POST, on the system 800. The self-test can test the functionality of the various hardware components 802-818. The firmware 812 can address and allocate an area in the memory 818 to store an OS. The firmware 812 can load a boot loader and/or OS, and give control of the system 800 to the OS. In some cases, the firmware 812 can communicate with the hardware components 802-810 and 814-818. Here, the firmware 812 can communicate with the hardware components 802-810 and 814-818 through the chipset 802, and/or through one or more other components. In some cases, the firmware 812 can communicate directly with the hardware components 802-810 and 814-818.

It can be appreciated that example systems 700 and 800 can have more than one processor (e.g., 730, 810), or be part of a group or cluster of computing devices networked together to provide greater processing capability.

For clarity of explanation, in some instances, the present disclosure may be presented as including individual functional blocks including functional blocks, such as devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers, or computing devices that can be used to operate any of a number of applications. User or client devices can include any number of general purpose personal computers, such as desktop or laptop computers running a standard operating system, as well as cellular, wireless, and handheld devices running mobile software, and capable of supporting a number of networking and messaging protocols. Such a system can also include a number of workstations running any variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers; or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including, but not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method executed by a remote utility to update firmware on a computing device communicatively coupled to the remote utility, wherein the remote utility can complete an update procedure, comprising:
    retrieving an existing image of the firmware from a firmware storage device in the computing device, wherein the existing firmware is exclusively located on the firmware storage device, and includes at least one user change;
    retrieving a new image of updated firmware;
    analyzing the existing image and the new image;
    based on analysis of the existing image and the new image, creating a processed image from the existing image and the new image; and
    writing the processed image to the firmware storage device of the computing device.

2. The computer-implemented method of claim 1, wherein retrieving the existing image of the firmware further comprises receiving the existing image from a management device on the computing device.

3. The computer-implemented method of claim 2, wherein writing the processed image to the firmware storage device further comprises overwriting the existing image with the processed image through the management device.

4. The computer-implemented method of claim 3, wherein the computing device is powered off.

5. The computer-implemented method of claim 3, wherein analyzing the existing image further comprises comparing a plurality of updates in the new image with existing data from the existing image to identify the existing data that does not conflict with the new image.

6. The computer-implemented method of claim 5, wherein creating the processed image further comprises combining the new image with non-conflicting existing data to form the processed image.

7. The computer-implemented method of claim 3, further comprising rebooting the computing device such that the processed image runs on the firmware storage device.

8. A computer system configured for updating, by a remote utility, an existing image on a computing device wherein the remote utility is communicatively coupled to the computing device, comprising:
- a memory;
- a processing unit in communication with the memory, and storing instructions which, when executed, cause the remote utility to perform operations comprising:
    - retrieving an existing image of the firmware from a firmware storage device in the computing device, wherein the existing firmware is exclusively located on the firmware storage device, and includes at least one user change;
    - analyzing the existing image and a new image;
    - based on analysis of the existing image and the new image, creating a processed image from the existing image and the new image; and
    - writing the processed image to the firmware storage device of the computing device.

9. The computer system of claim 8, wherein retrieving the existing image of the firmware further comprises receiving the existing image from a management device on the computing device.

10. The computer system of claim 8, wherein writing the processed image to the firmware storage device further comprises overwriting the existing image with the processed image through the management device.

11. The computer system of claim 10, wherein the computing device is powered off.

12. The computer system of claim 10, wherein analyzing the existing image further comprises comparing a plurality of updates in the new image with existing data from the existing image to identify the existing data that does not conflict with the new image.

13. The computer system of claim 10, wherein creating the processed image further comprises combining the new image with non-conflicting existing data to form the processed image.

14. The computer system of claim 10, wherein the instructions further comprise:
- rebooting the computing device after writing the processed image; and
- running the processed image on an operating environment of the firmware storage device.

15. A non-transitory computer-readable medium storing instructions which, when executed by a remote utility, cause the computer system to update an existing image on a computing device communicatively coupled to the remote utility, wherein updating the existing image comprises:
- retrieving an existing image of the firmware from a firmware storage device in the computing device, wherein the existing firmware is exclusively located on the firmware storage device, and includes at least one user change;
- analyzing the existing image and a new image;
- based on analysis of the existing image and the new image, creating a processed image from the existing image and the new image; and
- writing the processed image to the firmware storage device of the computing device.

16. The non-transitory computer-readable medium of claim 15, wherein retrieving the existing image of the firmware further comprises receiving the existing image from a management device on the computing device and wherein writing the processed image to the firmware storage device further comprises overwriting the existing image with the processed image through the management device.

17. The non-transitory computer-readable medium of claim 16, wherein the computing device is powered off.

18. The non-transitory computer-readable medium of claim 16, wherein the step of analyzing the existing image further comprises comparing a plurality of updates in the new image with existing data from the existing image to identify the existing data that does not conflict with the new image.

19. The non-transitory computer-readable medium of claim 16, wherein the step of creating the processed image further comprises combining the new image with non-conflicting existing data to form the processed image.

20. The non-transitory computer-readable medium of claim 16, wherein the instructions, when executed further cause the computer system to perform operations comprising:
- rebooting the computing device after writing the processed image; and
- running the processed image on an operating environment of the firmware storage device.

* * * * *